United States Patent [19]
Hanson

[11] Patent Number: 5,957,427
[45] Date of Patent: Sep. 28, 1999

[54] ISOLATION MOUNTING DEVICE

[75] Inventor: Jeffrey S. Hanson, Wakfield, R.I.

[73] Assignee: The United States of America as represented by the Secretary of the Navy

[21] Appl. No.: 08/645,732

[22] Filed: May 14, 1996

[51] Int. Cl.⁶ ................................................. F16M 13/00
[52] U.S. Cl. ...................... 248/635; 248/634; 267/153
[58] Field of Search .................................. 248/635, 634, 248/638, 632, 615; 267/136, 141, 153, 292

[56] References Cited

U.S. PATENT DOCUMENTS

| | | | |
|---|---|---|---|
| 3,343,770 | 9/1967 | Szonn | 267/153 |
| 3,351,309 | 11/1967 | Harrison | 267/153 |
| 3,592,423 | 7/1971 | Mui | 248/24 |
| 3,800,449 | 4/1974 | Minatodani et al. | 40/2 R |
| 4,858,866 | 8/1989 | Werner | 248/213.3 |
| 4,858,880 | 8/1989 | Durand | 248/635 |
| 4,884,656 | 12/1989 | Baheti et al. | 181/207 |
| 5,031,873 | 7/1991 | Rau | 248/634 X |
| 5,265,552 | 11/1993 | Taylor | 114/219 |
| 5,397,206 | 3/1995 | Sihon | 411/544 |

*Primary Examiner*—Ramon O. Ramirez
*Assistant Examiner*—Long Dinh Phan
*Attorney, Agent, or Firm*—Michael J. McGowan; James M. Kasischke; Prithvi C. Lall

[57] ABSTRACT

An isolation mounting device or assembly is used to mount items or components to a structure in an environment susceptible to vibrational energy, such as a vehicle. The isolation mounting device includes a damping portion, such as a piece of elastomeric damping material, bonded to the surface of the structure to isolate the mounting device and the component from vibrational energy transmitted through the structure. A support base, such as an aluminum block, is bonded to the damping portion to support the component. A fastener engaging portion is fixed to and extends from the support base to engage a fastener that secures the component to the support base. For example, a assembly can be crimped into an aperture formed in the support base so that an internally threaded snap nut post extends through the component and receives a bolt that secures the component to the support base. The component is then easily and removably mounted to the structure without enhancing the transmission of vibration.

18 Claims, 1 Drawing Sheet

ISOLATION MOUNTING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to an isolation mounting device and in particular, to a vibration isolation mounting device for isolating components mounted to a structure susceptible to vibrations.

(2) Description of the Prior Art

Problems caused by vibrational energy or noise are common when items or components are secured to a metal structure in an environment that transmits vibrational energy. The transmission of vibrational energy from the structure to an item or component mounted thereto is particularly a concern in all types of vehicles. In particular, noise is generated by propulsion systems such as motors or engines, and vehicles. The vibrational energy from the sources excites the structure of the vehicle, such as the metal shell surrounding the vehicle. Any items or components mounted to the structure, particularly metal items, will increase the transmission of this vibrational energy.

Accordingly, in vehicles or other similar environments subjected to vibrational energy, it is desirable to be able to mount components to the structure in a way that isolates the components from the vibrational energy transmitted through the structure.

Prior vibration isolation devices have not provided a simple and inexpensive way to mount components to a structure while isolating the components from vibrations transmitted by the structure. In particular, U.S. Pat. No. 5,265,552 to Taylor, U.S. Pat. No. 5,397,206 to Sihon, U.S. Pat. No. 4,858,880 to Durand, and U.S. Pat. No. 4,884,656 to Baheti, et al. do not disclose isolation devices that are simple to install, inexpensive, and effective in isolating vibrations.

U.S. Pat. No. 5,265,552 to Taylor discloses a shock and vibration isolator for mounting a component to an underwater body such as the hull of a ship or submarine. However, the device directly mounts a metal housing 15 to the hull structure 13 with screws 19. Thus, vibration could be transmitted from the hull 13 to the metal housing 15 and screws 19, and vibrations are not effectively reduced. Such a device is also not easily secured to the hull structure and component.

U.S. Pat. No. 5,397,206 to Sihon and U.S. Pat. No. 4,858,880 to Durand show isolation fasteners for use with engines. However, these devices require that a threaded fastener be directly threaded into the structure transmitting the vibrations and require many separate parts such as resilient pads and grommets.

U.S. Pat. No. 4,884,656 discloses a vibration isolating mount that requires mounting in a hole formed in the structure. Such a mount is clearly not feasible for use with a hull or structure in an underwater vehicle.

SUMMARY OF THE INVENTION

It is therefore an object of the present invention to provide a simple and inexpensive isolation mounting device that effectively isolates a component from a structure transmitting vibrations. Preferably, the isolation mounting device includes a piece of damping material directly in contact with the vibrating structure so as to prevent any metal-to-metal contact with the structure, thereby effectively isolating the mounting device and the component from the vibrational energy. Further, a mounting assembly that is fixed to the piece of damping material should allow an item or component to be easily, securely and removably mounted to the structure without affecting the integrity of the structure. For example, a support base secured to the damping material, such as by bonding, and a threaded fastener assembly provide a simple way of securing various items or components while maintaining isolation from the structure.

The present invention features an isolation mounting device for mounting a component to a structure while isolating the component from the vibrational energy in the structure. The device comprises a damping portion such as a piece of damping material that is fixed to a surface of the structure and a support base fixed to the damping portion and vibrationally isolated from the structure. A fastener engaging portion extends from at least a portion of the support base and a fastener engaged or fastened to the fastener engaging portion secures the component between the fastener and the support base, whereby the component is mounted to the structure and the damping portion reduces transmission of vibrational energy from the structure to the component.

In a preferred embodiment, the fastener engaging portion includes an elongated, internally threaded post extending from the support base through the component, such as that of a snap nut crimped to the support base and extending through a hole in the support base. In this embodiment, the fastener includes a threaded fastener, such as a snap nut bolt, threadably engaged with the elongated, internally threaded post. The damping portion is a block of elastomeric material, and the support base is a block of rigid material such as aluminum. Preferably, a bonding compound bonds both the damping portion to the structure and bonds the support base to the damping portion.

In another embodiment, the isolation mounting device includes a stand-off portion positioned between the support base and the component to accommodate components of varying sizes and thicknesses. In the preferred embodiment, a stand-off sleeve is positioned around the elongated internally threaded post and extends between the support base and the component.

The preferred use of the isolation mounting device is on a structure subject to vibrational energy, such as the hull of an underwater vehicle. The isolation mounting device prevents vibrations in the hull from being further transmitted to the mounting device itself or to components mounted on either the interior or exterior surfaces with the isolation mounting device.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
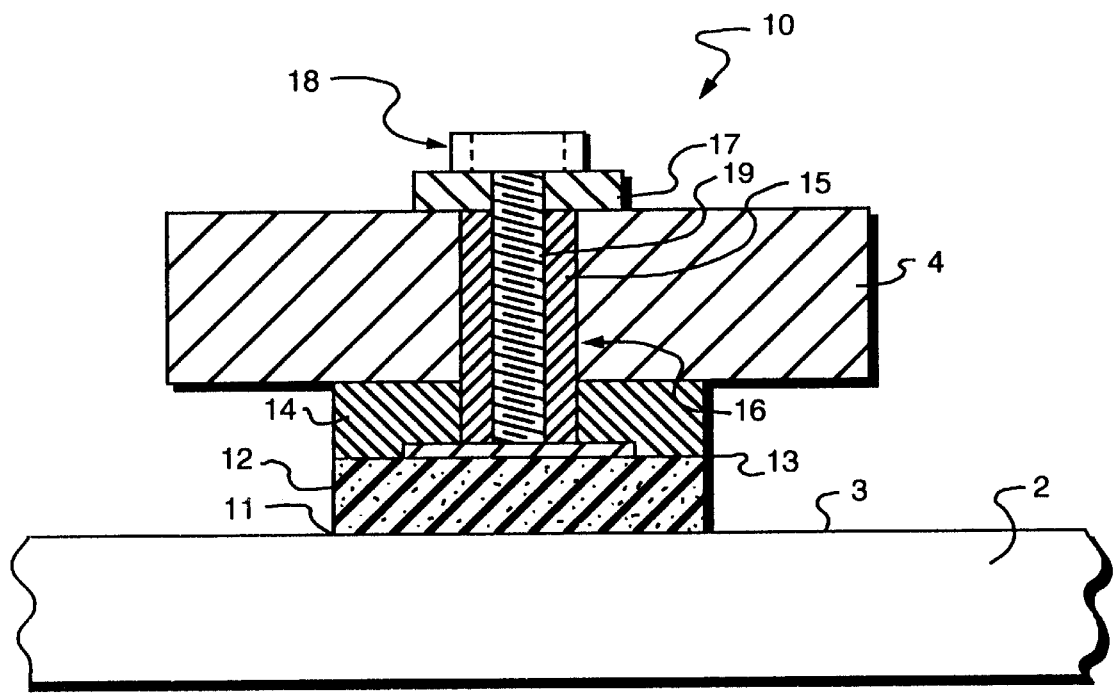
FIG. 1 is a cross-sectional view of an isolation mounting device in an assembled condition according to one embodiment of the present invention.

An isolation mounting device or assembly 10, FIG. 1 according to the present invention generally includes a damping portion 12, a support base 14, a fastener engaging portion 16 and a fastener 18. The isolation mounting device 10 is used to mount components 4 to a structure 2 that is susceptible to vibrational energy. For example, the isolation mounting device 10 is particularly useful to mount items or components to structure in a vehicle. The isolation mounting device 10 allows the components to be mounted while preventing the transmission of vibrational energy from the structure 2 to the components.

The damping portion 12 typically includes a piece of material positioned generally between the structure 2 and the support base 14 to prevent vibrations from being transmitted to support base 14, fastener assembly 16, 18 and component 4. Preferably, the damping portion 12 is a block of elastomeric material, such as C-1002-12 manufactured by EAR Division, Cabot Corp., or the like. The present invention contemplates, however, using any suitable elastomeric material that will sustain the particular temperature environment and sufficiently prevent the transmission of vibrational energy from the structure 2. The damping ratio of the material should be near one for a large frequency band.

The elastomeric material of damping portion 12 is typically bonded to the surface 3 of the structure 2 with a bonding compound 11, such as a two part epoxy. Other bonding compounds or epoxies can be used that preferably effectuate a homogenous bond between the damping portion 12 and surface 3 and will withstand the particular temperature environment. Also, an epoxy of lower toxicity is preferred.

The bonding of the damping portion 12 is accomplished by first preparing the surface 3 of the structure 2 by sandblasting the surface 3. If a two part epoxy is used, the first liquid part is applied to the area in a way that minimizes the thickness of this part of the epoxy, for example, with a trowel. The second aerosol spray part of the epoxy compound is then lightly applied to the piece of elastomeric material of the damping portion 12. The user then has up to one hour to place the damping portion 12 onto the structure surface 3, but once the damping portion 12 is placed onto the structure surface 3, the bonding is completed in less than one minute.

The support base 14 is typically a piece of rigid material fixed to the damping portion 12 to support the fastener assembly 16, 18 and component 4. Preferably, the support base 14 is a block of aluminum material that is bonded to the damping portion 12. The present invention contemplates any material that would sufficiently support the fastener engaging portion 16 and component 4, would withstand the temperature environment and would be capable of bonding to the elastomeric damping portion 12. The support base 14 can also be bonded with a bonding compound 13, such as epoxy, by sandblasting the surface of the support base 14 and applying the epoxy bonding compound layer 13 in the same manner as described above.

Although aluminum and elastomeric material have been used as the support base 14 and the damping portion 12, the present invention contemplates various other shapes and thicknesses. Furthermore, the thickness of the damping portion 12 and support base 14 should be sufficient to accommodate the fastener necessary to secure the item or component 4 while reducing the transmission of vibrational energy.

The fastener engaging portion 16 generally extends from the support base 14 through component 4. The fastener 18 is fastened to the engaging portion 16 to secure the component 4 between the support base 14 and fastener 18. Preferably, the fastener engaging portion 16 has an internally threaded post 15 extending from the support base 14 and the fastener includes a threaded member 19 threadably engaged within the internally threaded post 15. The post 15 is fixed to support base 14 and extends through the component 4 so that the fastener 18 can secure the component 4 to the support base 14. A base portion 21 can be formed between post 15 and support base 14 to enhance the connection therebetween.

In one example, the fastener engaging portion 16 and fastener 18 include a snap nut assembly. A hole is punched through the support base 14 and the snap nut is inserted through the support base 14 and crimped to the support base 14 with a snap nut crimp tool. The snap nut is thereby effectively fixed to the support base 14 and the snap nut post 15 extends from the support base 14 through the component 4. In this embodiment, the support base 14 is bonded to the damping portion 12 after the snap nut has been fixed to the support base 14. The fastener or snap nut bolt 18 is then inserted into the snap nut post 15 to secure the item or component 4 to the structure 2. A washer 17 can also be used if necessary to further secure the component 4. Also, the present invention contemplates using other types of fasteners or rivets to secure the component 4, with or without washers.

Figure 2:
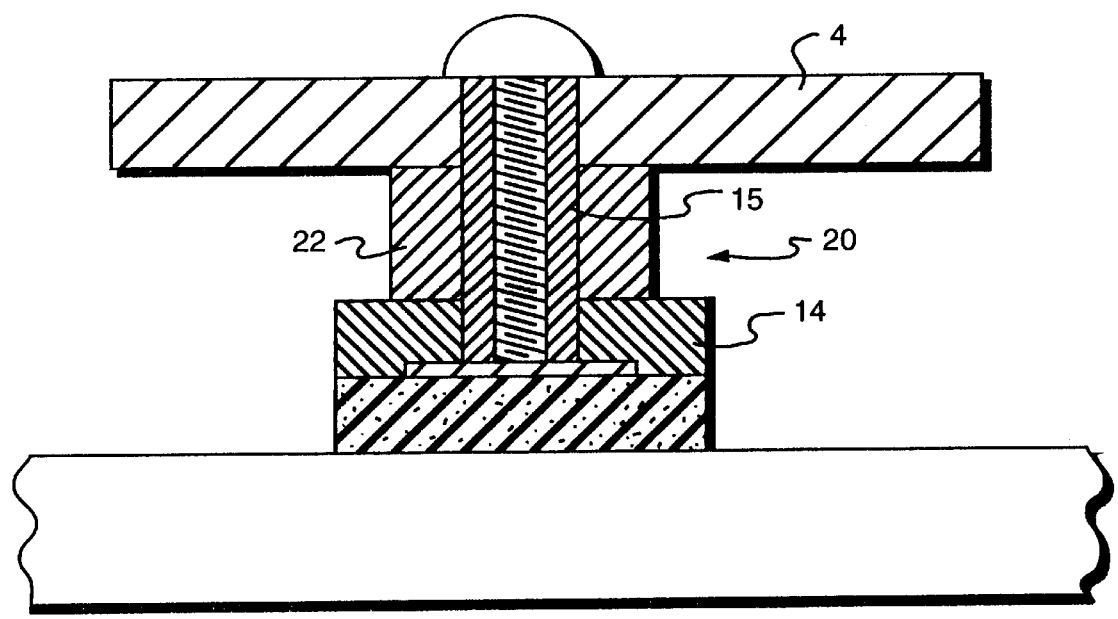
FIG. 2 is a cross-sectional view of another embodiment of the isolation mounting device including a standoff sleeve according to another embodiment of the present invention.

In another embodiment, FIG. 2, a stand-off portion 20 is positioned between the support base 14 and the component 4 to accommodate the varying thicknesses of components. Preferably, a stand-off sleeve 22 is used and is positioned around the post 15, such as the snap nut post, to securely mount a component of a lesser thickness.

Accordingly, the damping portion 12 prevents the component 4, the support base 14, the fastener engaging portion 16, the fastener 18 and any other metal pieces from contacting the structure 2 and transmitting vibrational energy. Further, the support base 14 and fastener assembly allow a component 4 to be mounted without having to actually bond the component itself to the damping portion 12. The isolation mounting device can also easily be fixed to the structure surface without affecting the integrity of the structure. Thus, a simple and inexpensive isolation mounting device is provided that reduces the transmission of vibrational energy by generally completely isolating the component and any other metal pieces that might increase the transmission of vibrations from the structure.

In light of the above, it is therefore understood that within the scope of the appended claims, the invention may be practiced otherwise than as specifically described.

What is claimed is:

1. An isolation mounting device, for mounting a component to a structure and isolating the component from vibrational energy in the structure, said isolation mounting device comprising:

a damping portion having a damping ratio near unity for a large frequency band fixed to a surface of the structure, said surface being roughened by sandblasting and said damping portion being bonded to said sandblasted surface;

a support base fixed to said damping portion, said support base being substantially vibrationally isolated from the structure; and a fastener engaging portion extending from at least a portion of said support base, said fastener engaging portion being substantially free from contact with said damping portion.

2. The isolation mounting device of claim 1, further comprising a fastener, fastened to said fastener engaging portion for securing the component between said fastener and said support base.

3. The isolation mounting device of claim 2, wherein said fastener engaging portion includes a threaded portion and said fastener includes a threaded fastener threadably engaged with said threaded portion for securing the component to said support base.

4. The isolation mounting device of claim 2, wherein said fastener engaging portion includes a base portion joined to said support base, and an elongated internally threaded post extending from said base portion and through the component.

5. The isolation mounting device of claim 4, wherein said threaded fastener includes a bolt threaded into said elongated internally threaded post extending through the component.

6. The isolation mounting device of claim 1, wherein said damping portion includes a block of elastomeric material.

7. The isolation mounting device of claim 1, further including a damping portion bonding compound between said damping portion and the surface of the structure for bonding the damping portion to the surface of the structure.

8. The isolation mounting device of claim 1, further including a support base bonding compound between said damping portion and said support base bonding said damping portion to said support base.

9. The isolation mounting device of claim 1, wherein said support base includes an aluminum block.

10. The isolation mounting device of claim 1, wherein:
   said support base has an aperture formed therein; and
   said fastener engaging portion comprises a snap nut crimped to said support base within said aperture.

11. The isolation mounting device of claim 1, further including a standoff portion positioned between said support base and the component.

12. The isolation mounting device of claim 4, further including a standoff sleeve positioned around said elongated internally threaded post and between said support base and the component, for accommodating components having various sizes.

13. An isolation mounting assembly adapted to mount a component to a structure and to isolate the component from vibrational energy in the structure, said isolation mounting assembly comprising:
   a piece of damping material having a damping ratio near unity for a large frequency band for bonding to the structure;
   a support base bonded to said piece of damping material for reducing vibrational energy transmitted from the structure;
   an elongated threaded portion fixed to said support base, said elongated threaded portion being substantially free from contact with said piece of damping material, and said elongated threaded portion being capable of extending through the component; and
   a threaded fastener threadably engaging said elongated threaded portion to secure the component to said support base, whereby the component is mounted to the structure and isolated from vibrational energy in the structure.

14. The isolation mounting assembly of claim 13, wherein:
   said support base has an aperture formed therein; and
   said elongated threaded portion has a snap nut crimped into said support base within said aperture, said threaded fastener being a bolt threaded into said snap nut.

15. The isolation mounting assembly of claim 13, wherein said support base includes an aluminum block.

16. The isolation mounting assembly of claim 13, wherein said piece of damping material includes a block of elastomeric material.

17. The isolation mounting assembly of claim 13, further including a bonding compound bonding said piece of damping material to the structure and bonding said support base to said piece of damping material.

18. The isolation mounting assembly of claim 17, wherein said bonding compound includes an epoxy compound.

\* \* \* \* \*